(12) United States Patent
Demir et al.

(10) Patent No.: US 7,805,331 B2
(45) Date of Patent: Sep. 28, 2010

(54) ONLINE ADVERTISER KEYWORD VALUATION TO DECIDE WHETHER TO ACQUIRE THE ADVERTISER

(75) Inventors: Ramazan Demir, Sherman Oaks, CA (US); Jiaqi Jin, Harrison, NJ (US); Kerem Tomak, San Francisco, CA (US); Supratim Roy Chaudhury, Santa Clarita, CA (US)

(73) Assignee: Yahoo! Inc., Sunnyvale, CA (US)

( * ) Notice: Subject to any disclaimer, the term of this patent is extended or adjusted under 35 U.S.C. 154(b) by 391 days.

(21) Appl. No.: 11/943,192

(22) Filed: Nov. 20, 2007

(65) Prior Publication Data
US 2009/0132336 A1    May 21, 2009

(51) Int. Cl.
*G06F 17/00*    (2006.01)
(52) U.S. Cl. ......................................................... 705/10
(58) Field of Classification Search ..................... 705/10
See application file for complete search history.

(56) References Cited
U.S. PATENT DOCUMENTS

2004/0133671 A1* 7/2004 Taniguchi ................... 709/224
2005/0144064 A1* 6/2005 Calabria et al. ............... 705/14
2005/0144068 A1* 6/2005 Calabria et al. ............... 705/14
2009/0024409 A1* 1/2009 Steelberg et al. ............... 705/1

OTHER PUBLICATIONS

Gastwirth, Joseph L., "The Estimation of the Lorenz Curve and Gini Index," *The Review of Economics and Statistics*, 54(3):306-316 (Aug. 1972).
Yitzhaki, Shlomo, "On an Extension of the Gini Inequality Index," *International Economic Review*, 24(3):617-628 (Oct. 1983).

* cited by examiner

*Primary Examiner*—Thomas Dixon
(74) *Attorney, Agent, or Firm*—Brinks Hofer Gilson & Lione; Nathan O. Greene; James L. Katz

(57) ABSTRACT

A method for valuating an advertiser considered for acquisition includes capturing click-related data by users with reference to a plurality of advertisements owned by a plurality of advertisers in a keyword market; calculating a marginal value of each of the plurality of advertisers as a function of a plurality of averaged market factors, wherein the marginal value of an additional advertiser is also calculated to result in at least an estimated displaced revenue if at least one advertisement of the additional advertiser for at least one keyword were competitively included in the keyword market; and deciding whether to pursue the additional advertiser based on the marginal value of the additional advertiser as associated with the at least one keyword.

25 Claims, 10 Drawing Sheets

ONLINE ADVERTISER KEYWORD VALUATION TO DECIDE WHETHER TO ACQUIRE THE ADVERTISER

BACKGROUND

1. Technical Field

The disclosed embodiments relate to online advertiser acquisition and valuation, and more particularly, to a system and methods for determining whether to pursue an advertiser together with keywords related to the advertiser.

2. Related Art

Online service providers (OSP) are oftentimes also advertisement brokerage providers, which serve advertisements ("ads") to pages of content providers. The advertisers pay the OSP for click activity on served ads; the OSP in turn pays the content providers for the traffic attracted to create the click activity, keeping a percentage as a fee. The OSP also includes search and media businesses services to acquire, identify, and serve ads to Web searchers (variably referred to as users or consumers) who seek information on products or services and who want to transact business online or offline.

Every query or information request is associated with a search or a browsing action to a web page, which may include ads. For a query, such as "dental services," the OSP matches and serves relevant dentists for the searcher. Sets of queries create the notion of "keyword market." In order to provide relevant ads to user queries, the OSP constantly needs to establish an advertiser base, which in turn builds an inventory of ads that can be served in response to keyword queries or on Web pages of related content. Size and depth of an ad inventory effectively controls the OSP's capability of fulfilling needs of online users that arise in diverse settings, to include but not limited to user demographics, products and services, online and offline needs, geography, interest categories, etc. Thus, the OSP's inventory-building strategy requires systems and methods to guide decision-making in advertiser acquisition and retention while meeting its business objectives.

SUMMARY

By way of introduction, the embodiments described below are drawn to maximizing page yield in the display of advertisements to searching Web users, and more particularly, to determining optimized display depth on search results pages to maximize page yield.

In a first aspect, a method is disclosed for valuating an advertiser considered for acquisition, including capturing click-related data by users with reference to a plurality of advertisements owned by a plurality of advertisers in a keyword market; calculating a marginal value of each of the plurality of advertisers as a function of a plurality of averaged market factors, wherein the marginal value of an additional advertiser is also calculated to result in at least an estimated displaced revenue if at least one advertisement of the additional advertiser for at least one keyword were competitively included in the keyword market; and deciding whether to pursue the additional advertiser based on the marginal value of the additional advertiser as associated with the at least one keyword.

In a second aspect, a method is disclosed for developing a keyword value index in advertisement markets to enable adoption of advertiser acquisition strategies, including: tracking click activity by users with reference to a plurality of advertisements owned by a plurality of advertisers in a keyword market, wherein the advertisements are displayed to the users through a set of hierarchal search results pages; defining a plurality of state dimensions with regards to at least one keyword related to at least one advertisement, including at least one of a page display depth, a page quality score, and a page bid; capturing a user response and market state changes to the at least one keyword and corresponding advertisement, including data representative of at least a number of clicks and a realized revenue therefrom; identifying a probability distribution that models changes in at least one state dimension based on the defined state dimensions and the user market response; calculating value indices for the at least one of the page display depth, the page quality score, and the page bid from the probability models; and aggregating a plurality of the value indices at a level of the at least one keyword for the advertiser that owns the at least one advertisement to adopt an advertiser acquisition strategy.

In a third aspect, a method is disclosed for valuating an advertiser and associated keywords considered for acquisition, including tracking click activity by users with reference to a plurality of advertisements owned by a plurality of advertisers in a keyword market; identifying a plurality of keywords as a set of relevant keywords for a particular advertiser of the plurality of advertisers within the keyword market; identifying a subset (L) of the set of relevant keywords as those keywords that the advertiser can efficiently track; calculating a marginal value of each of the keywords within the subset L of keywords for the particular advertiser, wherein each marginal value is based on at least an estimated displaced revenue if at least one advertisement of the particular advertiser for each keyword were competitively included in the keyword market; and deciding whether to pursue at least some of the subset L of keywords of the set of relevant keywords for the particular advertiser in the keyword market based on the marginal values of each respective keyword.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
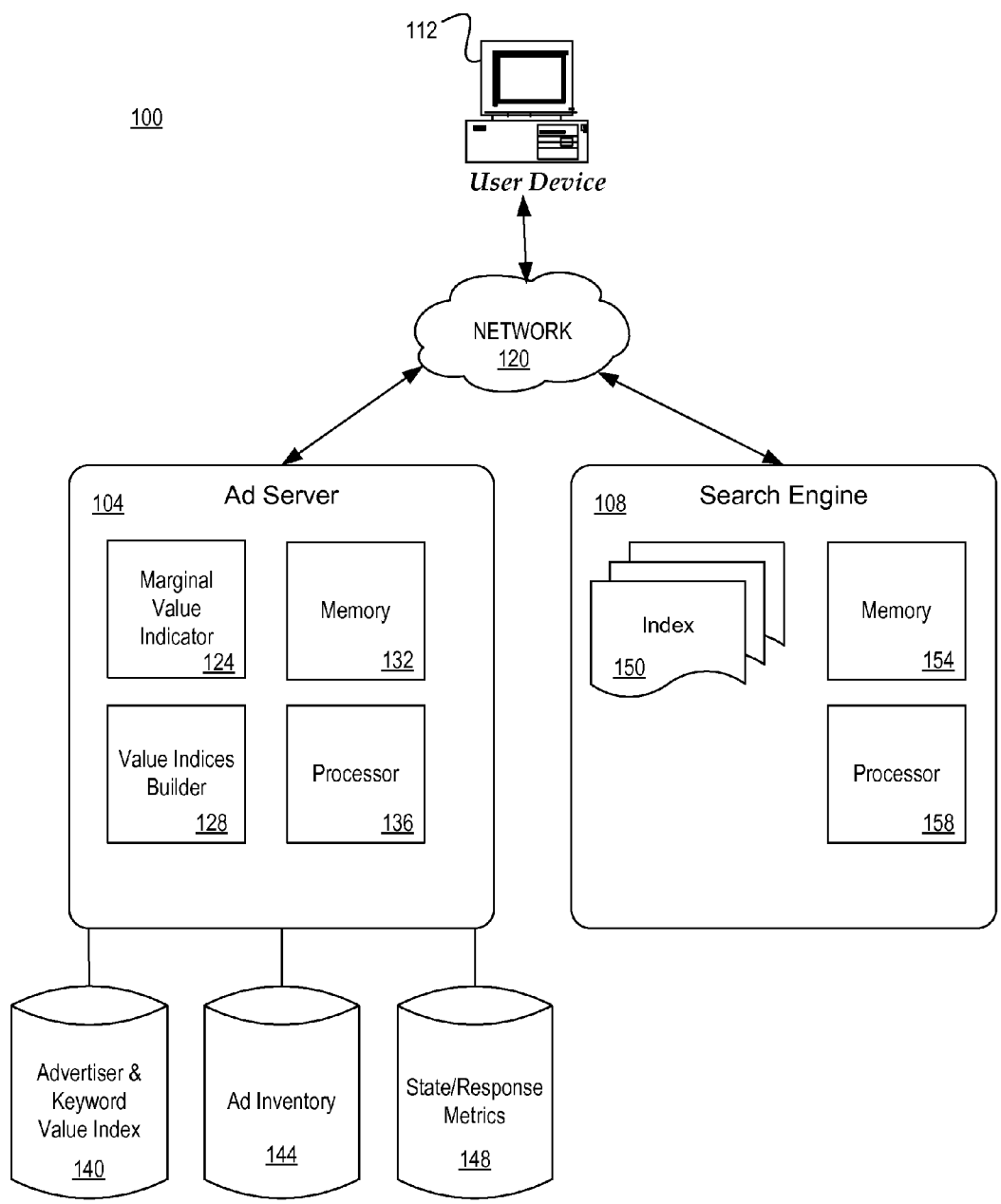
FIG. 1 illustrates a system diagram of a system designed to analyze online user and advertiser market responses to valuate advertisers in keyword markets with which to make advertiser acquisition decisions.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

This disclosure proposes systems and methods that quantify advertiser value and marginal advertiser value to a keyword market. Advertiser value is a general term for the total value of an advertiser to search and browse-related marketing of an online service provider (OSP). The advertiser value, once calculated, identifies and characterizes advertiser features for those advertisers that generate the most value to the OSP. The system that performs such calculations (discussed below) targets new (or additional) outside advertisers that match a set of features that are most valued. The advertiser value system also helps determine why advertisers pull their ads business from the OSP, e.g., due to low click volumes.

Figure 11:
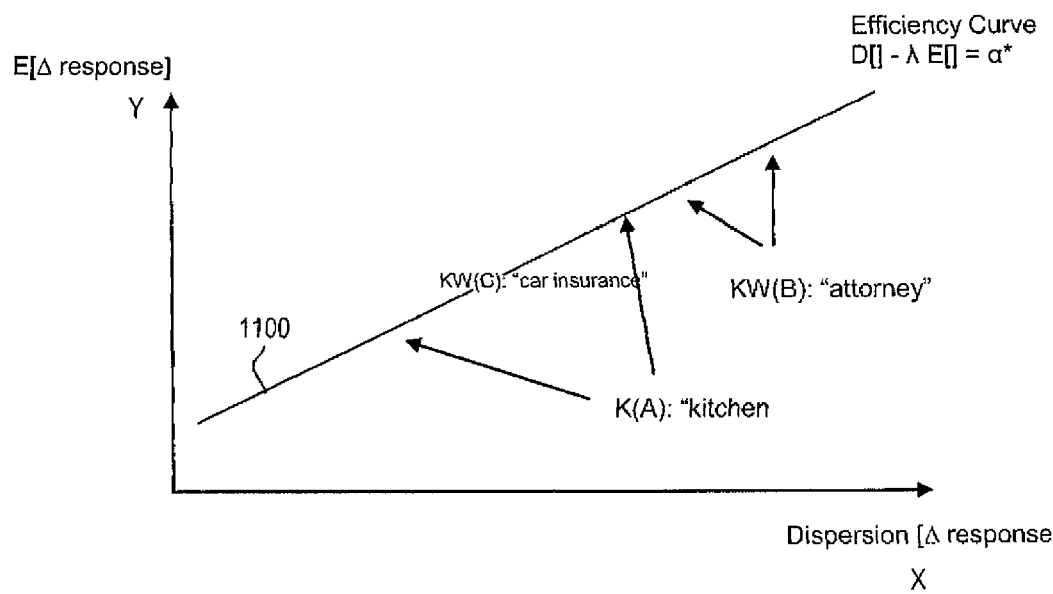
FIG. 11 is a graph depicting an efficiency curve that tracks expected changes in market response against dispersions of actual market response to represent accuracy of market response change predictions.

Marginal advertiser value is a term that relates the above general advertiser value to a particular keyword market. The term keyword market herein refers to a set of related keywords that may be grouped in their target of similar consumer markets. For example, a keyword market may include: automobile; car; vehicle; used cars; new car sales; etc. The list may be extensive, and oftentimes similar root words may be listed together, such as computer, computing, compute, etc. The system and methods discussed herein calculate the incremental value of an additional advertiser to a given keyword market assuming minimum competition and efficiency scales are reached. Competition relates to the level at which advertisers bid higher for keywords because of the demand for related products or services by consumers targeted by the keywords. Efficiency relates to the level at which user and advertiser response to a particular keyword reaches expected market responses (FIG. 11).

The system and methods herein intend to answer business-related questions for the OSP, such as what the value of an additional advertiser is to an existing keyword market; what the displaced value is if one additional advertiser is infused into the keyword market; how many advertisers may be added to a keyword market before it becomes saturated; and how do two keywords compare in terms of competitiveness.

Each advertiser can be represented by a set of keywords and be quantified in value at the advertiser and marginal advertiser levels in a keyword market. As advertiser value and marginal values are quantitative metrics, one can normalize valuations to reach a relative index in comparing two advertisers and two keyword markets, respectively, and can index other metrics to help decide on acquiring an advertiser-keyword combination.

FIG. 1 illustrates a system 100 designed to analyze online user and advertiser market responses to valuate advertisers in keyword markets with which to make advertiser acquisition decisions. The system 100 includes an ad server 104, a search engine 108, and a user device 112 used for searching and browsing by online users, all that communicate over a network 120. The network 120 may include the internet or World Wide Web ("Web"), a wide area network (WAN), a local area network ("LAN"), and/or an extranet.

The ad server 104 includes a marginal value indicator 124 to calculate marginal values of advertiser-keyword combinations, a value indices builder 128 to build value indices from the work performed by the marginal value indicator 124, a memory 132, and a processor 136. The ad server 104 further includes an advertiser and keyword value index database 140 (hereinafter "value index database") to store the value indices created by the value indices builder 128, an advertisement ("ad") inventory 144 database to store the advertisers' ads, and a state response metrics database 148 to store changes in state responses in keyword markets for both users and advertisers, as will be explained below.

The search engine 108 includes an index 150, a memory 154, and a processor 158. The index 150, together with the processor 158 and memory 154, categorize web pages of varying content, and return a hierarchal set of web pages in response to a query for certain keywords. The indexed web pages are saved in the index 150 in relation to those keywords. An OSP owns the search engine 108 and may also own the ad server 104. The ad server 104 is configured to communicate with the search engine 108 so that the ad server 104 also receives the hierarchal set of search results pages, and with matching technologies (not shown), serves a number of ads from the ad inventory database 144 that best match a queried-for-keyword to one or more search results pages of the hierarchal set of web pages.

The search engine 108 also returns organic search results in response to the keyword query that are publisher content pages relevant to the keyword that may or may not have a commercial object to their listing. Sponsored ads are also listed on a search results page, usually sequentially in a number of available slots arrayed from the top ("north"), to the side ("east"), and to the bottom ("south") of the organic search results. Sponsored ads are commercial in nature, paid for by the advertisers to the OSP for service of ads through the ad server 104. The slot location along the array of available advertisement slots is referred to herein as display depth. Also, the term "rank" as used herein relates to a level of an advertisement within the hierarchal set of search results pages usually returned in response to a keyword query. Decreasing rank means that an ad is located on a page deeper within the hierarchal set of search results pages and also perhaps that it located lower on that page.

Figure 2:
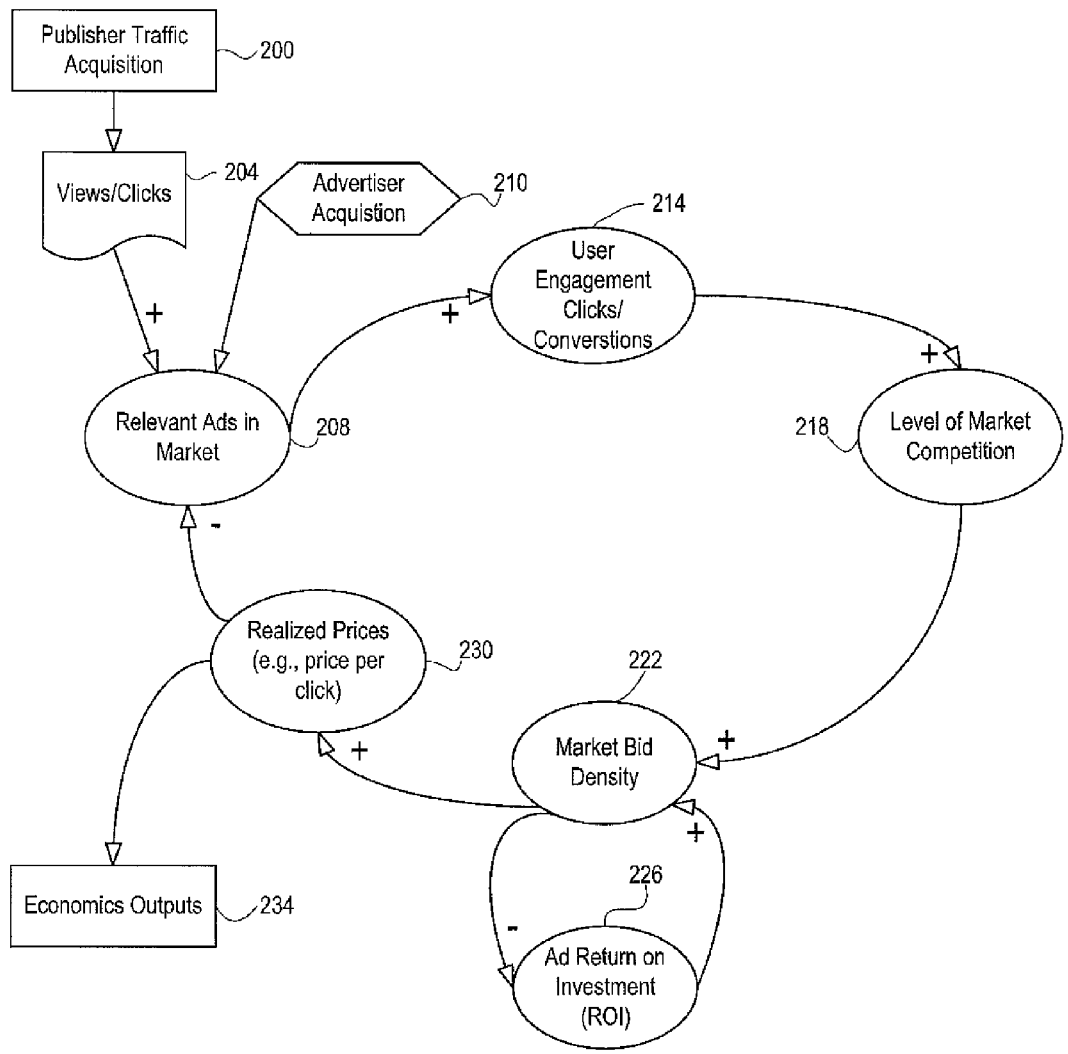
FIG. 2 is a flow diagram depicting value chain economics of an online service provider (OSP) as related to advertiser acquisition through valuation.

FIG. 2 is a flow diagram depicting value chain economics of an OSP as related to advertiser acquisition through valuation. The plus sign represents variables that move in the same direction as the arrows, whereas the minus sign represents variables that move in the opposite direction from the arrows. At block 200, publisher traffic is acquired. At block 204, the views and clicks, among other click-related actions, of online users are tracked. At block 208, relevant ads come into the keyword market through advertiser acquisition at block 210.

At block 214, online users engage with the relevant ads so that rates of clicks and conversions by the users can be tracked. At block 218, the level of market competition is ascertained by analysis of volume of clicking activity for various keywords. At block 222, a market bid density is ascertained related to the demand in advertising bidding for the keywords. At block 226, a return on investment (ROI) value is factored into the bidding demand for related keywords, which means that the level of clicks and conversions from block 214 and the market competition in block 218 must justify the bid price levels for the bid levels to remain steady or to grow. At block 230, revenue is realized from the bid prices sustained from block 222, such as a cost per click (CPC) or cost per impression (CPM). At block 234, the ultimate economics outputs are obtained by tracking revenue for particular keyword markets over time as related to user and advertiser response metrics.

Accordingly, the ability to quantify the marginal value of an additional advertiser to keyword markets gives an OSP the ability to expand ad inventory (144) in a relevant and economically beneficial way. The ability to expand ad inventory then controls to what extent matching technologies deliver the desired key performance metrics, which is a valuable tool for an OSP that attempts to find ways to increase user click rates and related revenue. Ad inventory in turn impacts relevancy in search and media businesses of an OSP, thereby affecting user experience and retention, click or conversion volume, and ultimately, OSP economics that seeks larger market shares through the cycle depicted in FIG. 2.

Unit marginal value or unit value index (UVI) of an additional advertiser are terms that refer to expected marginal values of advertisers to an OSP keyword market through augmenting competition by one additional advertiser. UVI ("keyword") will denote unit value index for the keyword denoted, for instance UVI ("car insurance") versus UVI ("laptop"). Total value index (TVI) is a value index that incorporates a total number of searches, a total number of clicks, and a summation of UVI over the same. For instance, TVI ("car insurance")=function (searches, clicks, UVI ("car insurance")) and TVI ("laptop")=function (searches, clicks, UVI ("laptop")).

Quantifying the (incremental) marginal value of an additional advertiser is complicated to estimate as the estimation depends on user, query, and keyword market attributes that include but are not limited to: number of bidders; existing advertiser class distribution; user click propensity; user conversion propensity; value to the advertiser; advertiser ROI metrics; relevancy or relative quality score of the advertiser to the keyword market; advertiser level of willingness to pay (e.g., bid prices); advertiser potential spend; and search engines matching, ranking, and pricing technologies. The quality score has reference to at least the relevancy of the keyword to an advertisement, and may be a function of at least one of a ranking, a click-through-rate (CRT), and a click yield of the ad of the additional advertiser.

The advertiser class distribution may be multi-dimensional, but for the purposes of this disclosure, the classes are segmented into market makers, market neutrals, and market followers. Market makers may blend direct response or brand awareness objectives. Market neutrals tend to be inactive in bidding and tend to get low click share and in general do not exceed the minimum efficiency scale in click volume. Market followers tend to be direct response players or aggregators/arbitrageurs. An arbitrageur seeks to buy and sell almost simultaneously to profit from price discrepancies in different markets, here, keyword markets.

Figure 3:
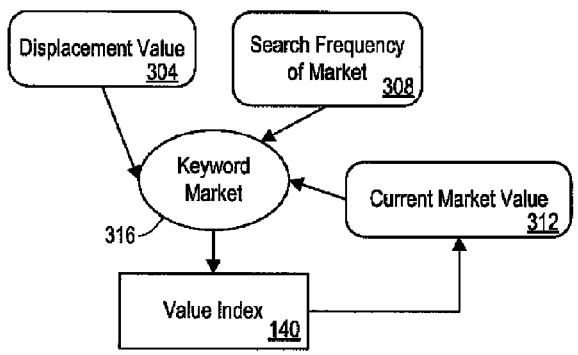
FIG. 3 is a flow diagram depicting affects on a value index for advertisers due to advertiser market displacement when an additional advertiser is included in a keyword market.

FIG. 3 is a flow diagram depicting affects on a value index for advertisers due to advertiser market displacement when an additional advertiser is included in a keyword market. Each of a displacement value 304, a search frequency 308 of keywords, and a current market value 312 for the keywords in a keyword market 316 go into building a value index 140. Again, the value indices builder 128 of the ad server 108 works with the marginal value indicator 124 as discussed above to build value indices related to keyword markets 316.

The displacement value 304 refers to any percentage of a keyword market that is displaced when an additional advertiser is infused (or included) within that market, e.g., the percentage of the market taken by the additional advertiser. Ideally, an additional advertiser provides additional value, thereby displacing a small percentage of the keyword market. The percentage may be viewed as that displaced from a total number of clicks or a total revenue. The search frequency 308 of the keywords by online users can be tracked and stored in the state response metrics database 148, and is yet another metric that drives market competition and return on investment for advertisers. The current market value 312 is a feedback value extractable from the value index 140 so that advertiser acquisition and retention decisions are determined iteratively due to the fact that keyword markets are not static.

Figure 4:
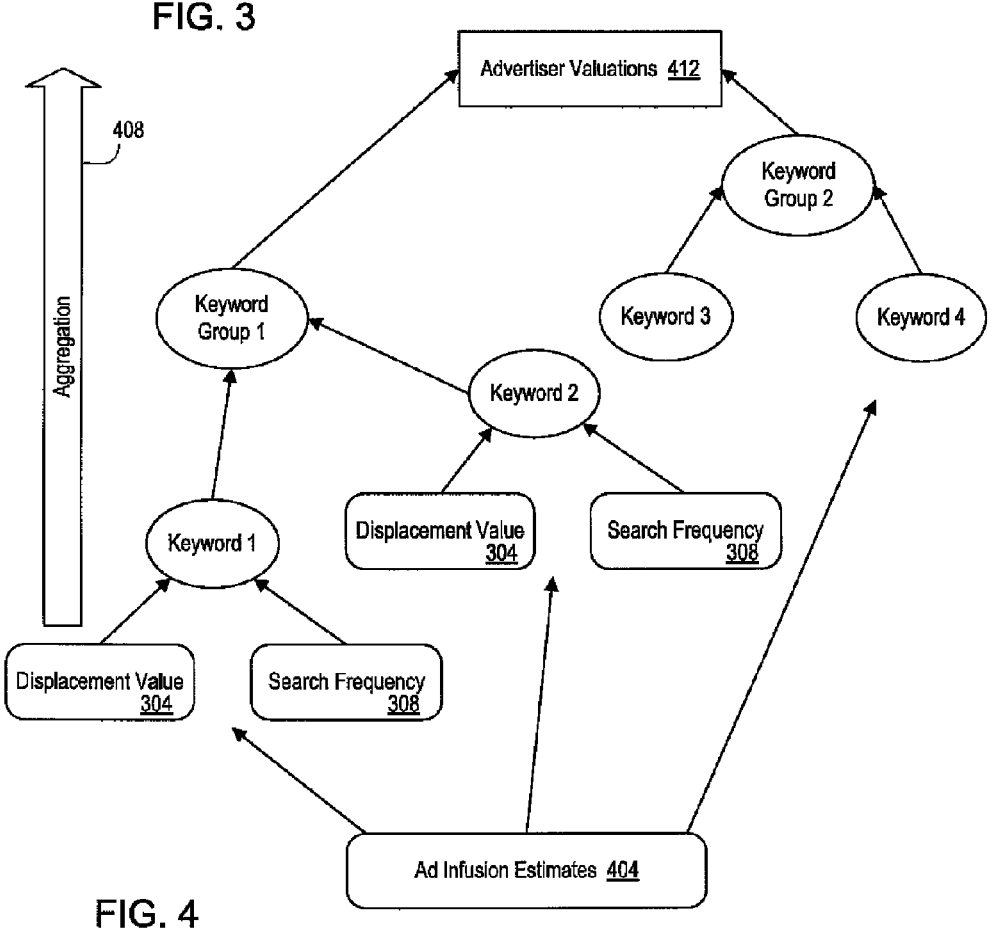
FIG. 4 is a flow diagram depicting a process for valuating advertisers across keyword groups of a keyword market through aggregation.

FIG. 4 is a flow diagram depicting a process for valuating advertisers across keyword groups of a keyword market through aggregation. At block 404, estimates are made based on ad infusion of an additional advertiser into a keyword market including groups of related keywords. For instance, as displayed, Keywords 1 and 2 are a part of Group 1 and Keywords 3 and 4 are a part of Group 2. Analytical modeling of each keyword as discussed with reference to FIG. 3 may be separately executed so that aggregation of all advertiser valuations may be performed throughout block 408. At block 412, the total of all advertiser valuations are stored in the advertiser keyword and value index 140 for availability to advertiser acquisition strategists, including algorithms that may be run or tables that may be created by the ad server 104 that recommend what advertiser-keyword combinations to pursue.

This disclosure proposes several tracks to first quantify the unit value index (UVI) and then to quantify the total value index (TVI) at the keyword level. Two approaches are proposed to calculate unit value index (UVI), methods A and B as follows.

Method A: Market State/Market Response:

The first proposed method is time-dependent state-space modeling, i.e. identification and mapping of states to response metrics. Market state (or just "state") should capture relevant information that has cause-effect relationship with response variables. As each market may represent a page of ads, "market state" and "page" are interchangeably used herein, but "page" may also represent a unit of measure that equates to a section of a page or to multiple pages. Analysis, however, may be performed at the individual page level with a more straightforward computation. A state may include, but is not limited to: number of ads, average page quality, average page bid, max quality score, max bid, dispersion of quality score, dispersion of bids, page placement factors (e.g., north or east ad cardinality; north or east quality score). Average page quality is the average of all advertisers' quality scores at a given time for a given page. Similarly, average page bid is the average bid of all advertisers in the market. North, east or south ad cardinality makes reference to, respectively, sponsored ads at the top, right side, and bottom of a search results page.

Response captures both user response and advertiser response where user response is measured in terms of click through/click yield or realized revenue therefrom. Tracking responses over time implicitly captures advertiser response as advertisers frequently update bids and revise creatives used within their ads in response to their campaign objectives, such as return on investment (ROI) targets or cost per acquisition (CPA) targets. Advertisers do not want to pay more than necessary for clicks and stop bidding high values if CPA exceeds advertiser's pre-set business goals.

Figure 5:
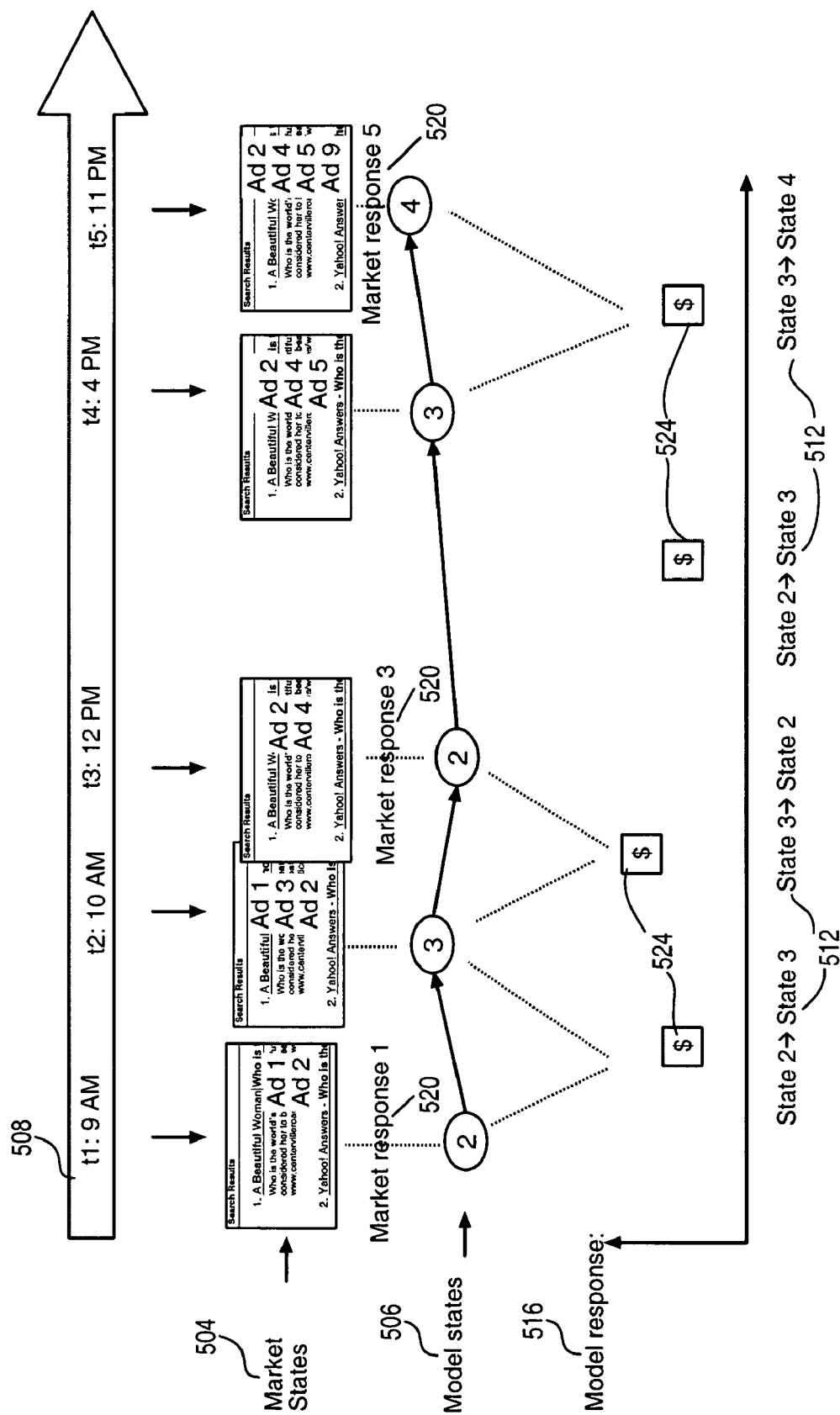
FIG. 5 is a graph depicting keyword market states and response time-series realizations.

Method A constructs and tracks state-response variables over time epochs; as time epochs correspond to individual queries, they are not necessarily homogenous in time segments. State variables include those mentioned above in addition to a number of exact bidders, a number of advanced bidders, the average page quality, and average market bid. Every time a state transition occurs, the system 100 knows how many ads are added to the market or extracted from the market. For each state transition, the system 100 calculates a change in (or delta) page quality and a change in (or delta) page bid. Simultaneously, the system 100 calculates changes in page response variables (page click or page revenue). FIG. 5 illustrates state transitions for query "apartment".

FIG. 5 is a graph depicting keyword market states 504 and response time-series realizations. A plurality of model states 506 correspond to a plurality of market states 504. Note that a timeline 508 at the top of the graph represents discrete moments in time at which market responses are sampled based on state transitions 512, e.g., a change in the composition of ads and/or display depth of those ads. A modeled response 516 is determined at each transition 512 based on the actual market responses 520 to create the model states 506. Finally, the changes in (or delta) responses 524 are calculated between the transitioned time periods.

Assume that $\partial d$ represents page display depth between time t and time t−1. Further assume that $\partial PQ$ represents change in page quality between time t and time t−1. Finally, let $\partial b$ represent change between bids at time t and time t−1. With these variables, the system 100 calculates state and response transitions so as to create tabular information such as shown in Table 1.

TABLE 1

| State transitions | Δ ads | State variables | | | | | Response | |
| | | Δ # of exact bidders | Δ # of advanced bidders | Δ page quality (PQ) | Δ page bid (b) | | Δ click yield | Δ revenue |
| --- | --- | --- | --- | --- | --- | --- | --- | --- |
| 1 | +1 | +3 | −2 | | | | | |
| 2 | −1 | −1 | 0 | | | | | |
| ... | +2 | +1 | +1 | | | | | |
| N | | | | | | | | |

Note that the change in the number of exact bidders and the change in the number of advanced bidders together include all available bidders. Utilizing Table 1 data for a given keyword, we construct interaction-based multi-variable regression models using widespread statistical packages to relate state changes (columns 1, 2, 3, 4, and 5) to response changes (columns 6 and 7). A coefficient of delta (Δ) page depth ($\partial d$) or delta (Δ) number of ads are defined as the marginal value of an advertiser to keyword market by fixing the page quality. In a functional form, the statistical model looks like:

$$\Delta(\text{Click or Revenue}) = f(\Delta\text{\# of ads}, \partial PQ, \partial b \times \partial PQ). \quad \text{Equation 1}$$

Where k denotes keyword, let $V(k, \partial d, \partial PQ, \partial b)$ denote average marginal value of an additional advertiser to the keyword market under a $(\partial d, \partial PQ, \partial b)$ combination under Equation 1 or based on empirical distributions discussed below. Let $V(k) = \iiint V(k, \partial d, \partial PQ, \partial b) \partial d \partial PQ \partial b$ be the average marginal value of an additional advertisers which incorporates possible combinations of $(\partial d, \partial PQ, \partial b)$ state-space. Note that V(k) may be determined without use of delta page depth ($\partial d$) where it is calculated for a unit of measure other than a page, e.g., the average marginal value for a section of a page or for more than one page. In such a case, the PQ and bid values represented above would indicate quality of the unit of measure being used. Unit value index (UVI) should satisfy the following three definitions.

$$V(k,\partial b+,\partial PQ) > V(k,\partial b-,\partial PQ); \quad (1.)$$

$$V(k,\partial b,\partial PQ+) > V(k,\partial b,\partial PQ-); \quad (2)$$

and $$V(k,\partial b+,\partial PQ+) > V(k,\partial b-,\partial PQ-). \quad (3)$$

Additionally, interaction-based multi-variable regression models may be used to relate state changes to response changes, which ultimately quantify the average value of an additional advertiser. In a functional form, the interaction-based multi-variable regression model may be expressed as:

$$\Delta\text{Response} = \alpha + \beta \times \partial d + \theta \times \partial PQ + \rho \times \partial b + \gamma \times \partial d \times \partial PQ + \text{normal error}. \quad \text{Equation 2}$$

Limitations of the existing models include lack of ability to track comings and goings of advertisers in the keyword market where tracking changes are not necessarily a controlled experiment. There exist modeling initiatives to validate the estimates from a controlled perspective. State changes in an aggregate view include, for instance, $\partial d = +2$ may mean there are four new advertisers with two old ads removed or that there are three new advertisers with one old ad removed. State transitions may be tracked in aggregate and iteratively processed to update marginal values of advertisers.

Figure 6:
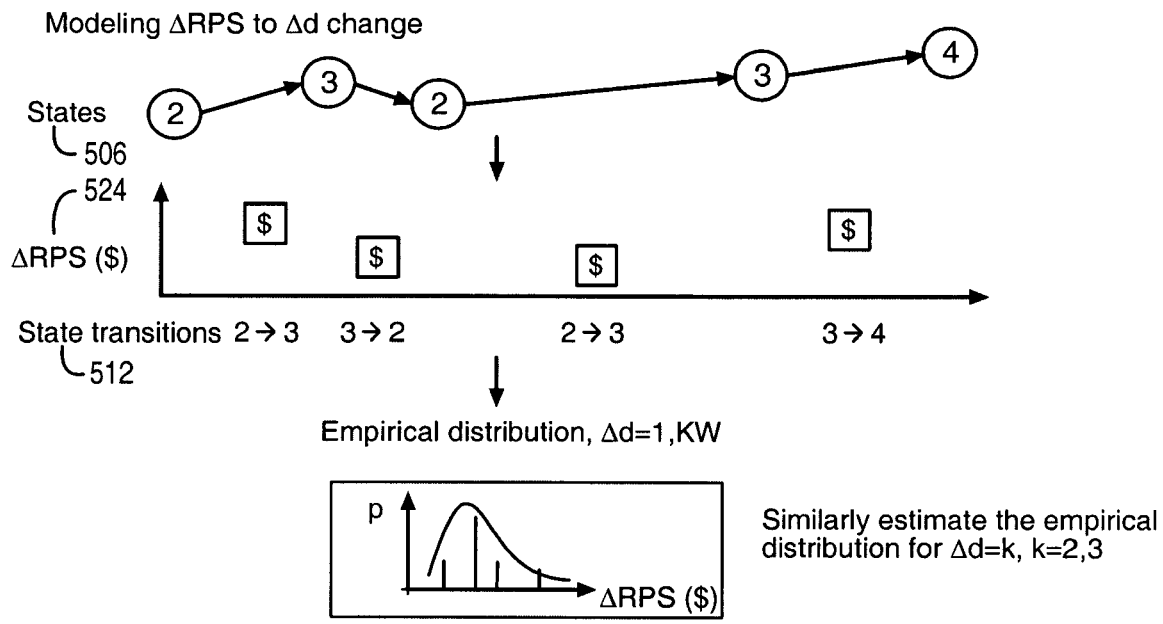
FIG. 6 is a graph of model state transitions obtained from FIG. 5, which results in empirical density calculations for different changes in display depth of advertisements, illustrated below the graph of model state transitions.

FIG. 6 is a graph of model state transitions 512 obtained from FIG. 5, which results in empirical density calculations for different changes in display depth $\partial d$ of advertisements, illustrated below the graph of model state transitions. (Note that "KW" stands for "keyword.") Another, parallel approach to the statistical method in Equation 1 is the estimating empirical distribution for delta responses ($\Delta$RPS). Probability distributions are constructed for delta response variables ($\Delta$revenue or $\Delta$click) for $\partial d$ change of a given keyword market.

Figure 7:
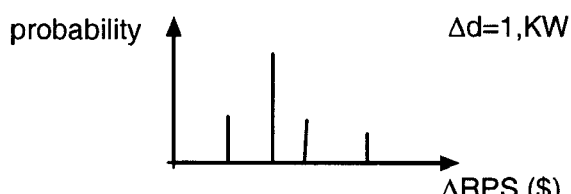
FIGS. 7-9 are graphs illustrating the empirical density calculations of FIG. 6 for different changes in display depth of advertisements, respectively, change in depth of 1, 2, and 3.
Figure 8:
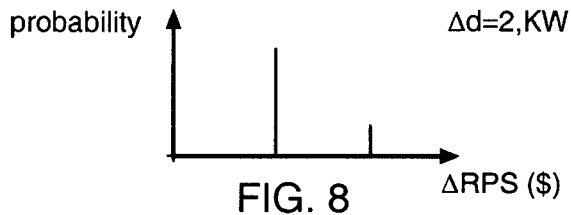
Figure 9:
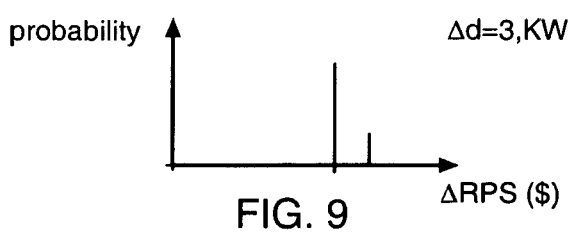

FIGS. 7-9 are graphs illustrating the empirical density calculations of FIG. 6 for different changes in display depth of advertisements, respectively, probability distributions according to changes in depth ($\partial d$) of 1, 2, and 3. Note that the probability distributions shift and generally decrease with decreasing increasing changes in display depth.

Figure 10:
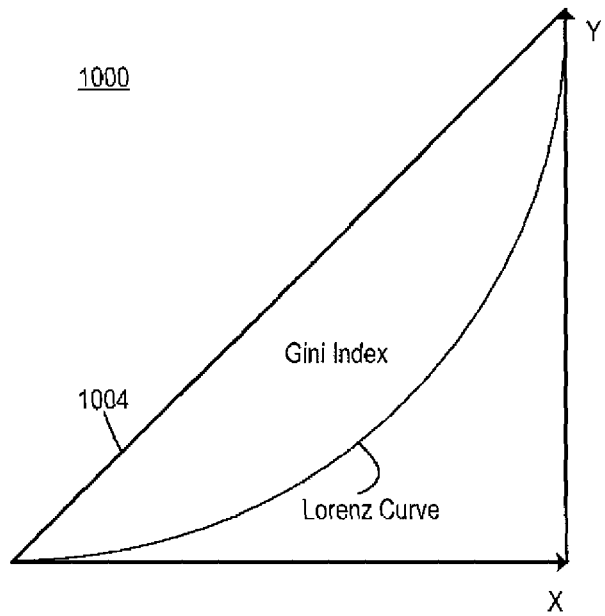
FIG. 10 is a graphical representation 1000 of the Gini coefficient.

FIG. 10 is a graphical representation 1000 of the Gini coefficient, wherein the area of the whole triangle is defined as one (1). Discussion of the Gini coefficient is introduced here to provide context for the dispersion calculations required as explained with reference to FIG. 11 and to Method B, but is not meant to be an exhaustive discussion on Gini indices.

The Gini coefficient is a measure of statistical dispersion most prominently used as a measure of inequality of income distribution or inequality of wealth distribution. Here, it relates to the inequality of revenue distribution attributable to clicks attracted by advertisers within a keyword market. The Gini coefficient is defined as a ratio with values between 0 and 1: the numerator is the area between the Lorenz curve of the distribution and a uniform distribution line 1004; the denominator is the area under the uniform distribution line 1004. Thus, a low Gini coefficient indicates more equal income (revenue) or wealth distribution, while a high Gini coefficient indicates more unequal distribution. Zero (0) corresponds to perfect equality (all advertisers having exactly the same revenue) and 1 corresponds to perfect inequality (where one advertiser has all the income, while all others have zero income). The Gini coefficient requires that no one have a negative net income or wealth.

The Gini index is the Gini coefficient expressed as a percentage, and is equal to the Gini coefficient multiplied by 100. The Gini coefficient is equal to half of the relative mean difference.

FIG. 11 is a graph depicting an efficiency curve 1100 that tracks expected changes in market response (Y axis) against dispersions of actual market response (X axis) to represent accuracy of market response change predictions. Once the response empirical distributions are computed, an expected response and a dispersion response are computed as two measures for a given keyword market. Expected response is the average of all responses that empirical distributions indicate. Let E[ ] denote the expected response value. Dispersion is a measure of variance of different response values. Herein, we use variance, or mean Gini index computations. See Yitzhaki, S., *On an Extension of the Gini Inequality Index*, International Economic Review, Vol. 24, No. 3 (October 1983), pp. 617-628; Gaswirth, J. L., *The Estimation of the Lorenz Curve and Gini Index*, The Review of Economics and Statistics, Vol. 54, No. 3 (August 1972), pp. 306-316. Let D[ ] denote the dispersion of response values. The Gini coefficient is related to the Gini index as discussed above. Further discussion of the calculation of the Gini index may be found in the above references to Yitzhaki and Gaswirth, which are hereby incorporated by reference.

From an efficient keyword market point of view, we hypothesize that expected response needs to counterbalance any dispersion. Conceptually, the linear curve in FIG. 11 represents an efficient market curve 1100; as (E[ ], D[ ]) are computed for each keyword, one can compute the distance to the efficient curve 1000 as related to the unit value index (UVI) of that keyword. For instance, the UVI of "attorney" is defined to be larger than the UVI of "car insurance." Unit marginal value of an additional advertiser is set so that it is inversely proportionate to the distance from the efficiency curve. In FIG. 11, for instance, keyword market "kitchen" is more appealing from the advertiser acquisition point of view than "car insurance." Displayed in functional form, UVI equals either of (1) 1/distance to efficiency curve ("keyword"); or (2) E[keyword]+$\lambda$D[keyword] where $\lambda$ is a business tuning parameter adjustable depending on advertising campaign goals. We expand further on option (2).

A primary state variable is display depth and primary response variables are clicks and realized revenue for states. Let $\partial R_{k,t}(\partial d, \partial PQ, \partial b)$ and $\partial C_{k,t}(\partial d, \partial PQ, \partial b)$ be state-response changes for t and t+1. We develop probability models for $\partial R_k$ and $\partial C_k$ which represent market response based on $\partial b, \partial Q, \partial d$ market changes. Mean (E[$\partial R_k$]) and dispersion (D[$\partial R_k$]D of a probability model ($\partial R_k$) is partially utilized in the value index calculation V(k). D[$\partial R_k$] is estimated by $\sigma \partial R_k$ and $\gamma \partial R_k$ where $\gamma$ is the Gini mean dispersion. Let V(k)=f(E[$\partial R_k$], D[$\partial R_k$])=E$_k$+$\lambda$D$_k$ indicate the value index for a keyword (k) where $\lambda$ is the business tuning parameter. Ideally, markets with higher variance relative to mean of distribution $\partial R_k$ represent greater opportunities. Currently, a learning period for $\partial R_k$ to $\partial d$ usually requires about 3-days of user queries and advertising-related data.

Method B. Market Attributes Approach for Unit Value Index:

Method B computes UVI of a keyword based on market attributes. Recall that UVI measures the incremental value of an advertiser to a keyword market. We propose functional forms that use Gini index of bid (b) and quality score (QS) by rank. Additionally, we propose building a Gini index of each advertiser's click share in the keyword market or on a page. We also propose modeling market utilization, which is a ratio of page bid to max bid, or a market spend ratio that is an actual amount spent compared to a budgeted amount. In a functional form: UVI=f(Gini(b×QS), Gini (click share), Market Utilization, Spend ratio); and Market utilization=Market Average CPC/[(Average Max Bid or Market Average Bid)/Average Max Bid]. Another way of displaying UVI includes either of (1) 1/market utilization ("keyword"); and (2) f(1/(market utilization, dispersion variants)).

Total Value Index Computation:

Using either Method A or Method B, we calculate UVI for a keyword. Total value index (TVI) simply incorporates the total number of searches/clicks as part of the total marginal value of additional advertisers as discussed previously. For instance, let f("keyword") denote the search frequency of a given keyword. Total value of an additional advertiser in that keyword market is estimated by:

$$\text{Total Value ("keyword")}=f(\text{"keyword"})\times UVI(\text{"keyword"}). \quad \text{Equation 3}$$

The above Methods A and B may be extended to valuate advertisers when more than one are infused, or competitively included, within a keyword market. Marginal value of multiple advertisers conceptually follows a diminishing marginal valuation curve as the new advertisers force the market to reach a saturation point. Assume a max value and a concave valuation curve versus numbers of advertisers.

Suppose a TVI of the keyword "auto body shop" is larger than the total value index of the keyword "auto glass." Sales, marketing or business development groups can infer that it would be best to first fill "auto body shop" market with additional advertisers/ads compared to the "auto glass" market. Marginal valuations are translated at keyword markets to an indexing mechanism that facilitates relative valuations or ranking in advertiser adoption. Several use cases as a derivation of marginal value or value indexing may include: (1) Relative valuations: keyword economic ranks; (2) Advertiser keyword subset selection: given an advertiser's universe (or total set) of keywords, the system and methods herein enable us to identify the optimal subset of keywords based on value indices; (3) Most illiquid keyword and most lucrative keywords for any advertiser acquisition, which is a "stock ticker" notion.

Figure 12:
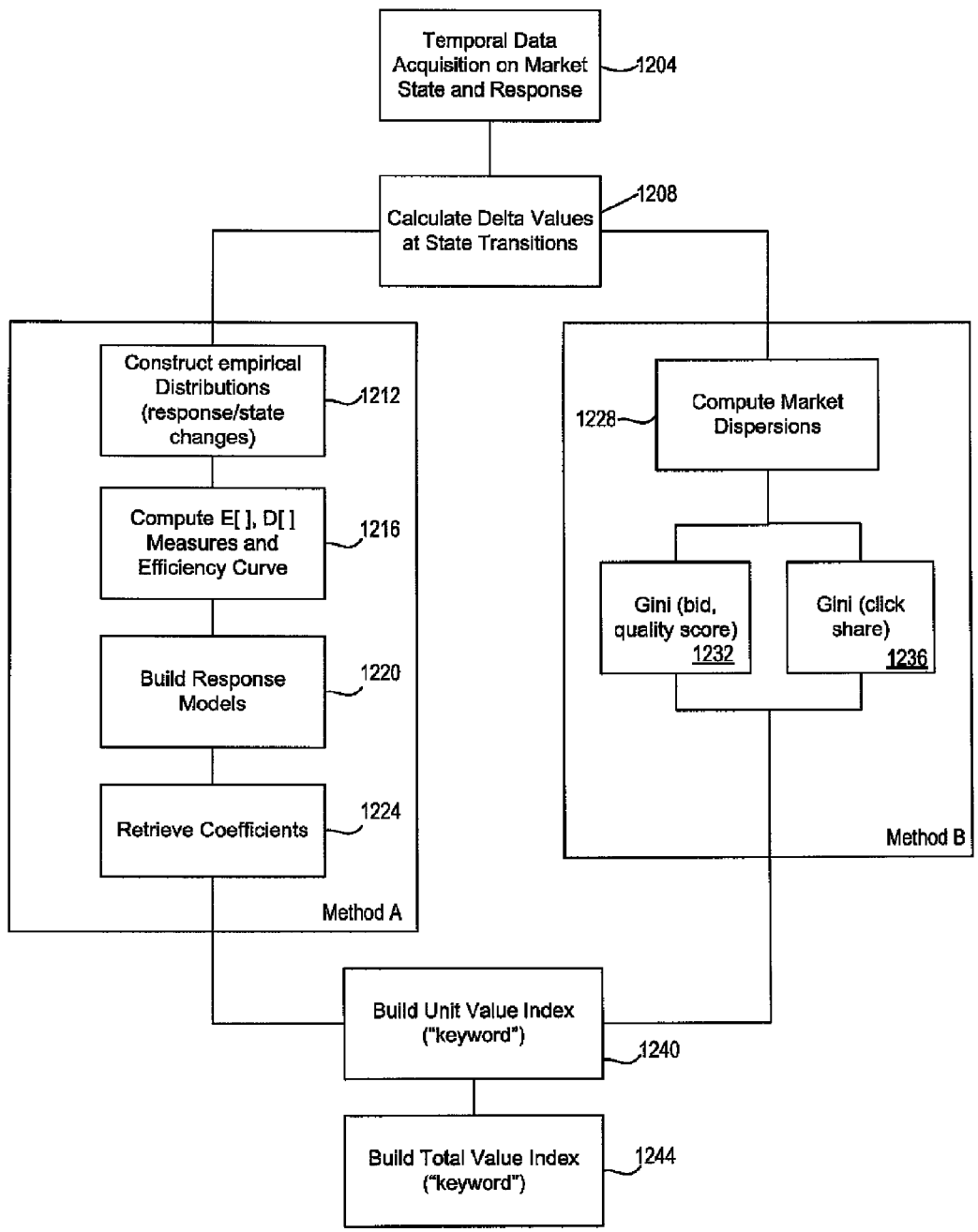
FIG. 12 is a flow diagram depicting two embodiments available for building a unit value index based on keywords from temporal data acquisition on market state and response variables.

FIG. 12 is a flow diagram depicting two embodiments, including Methods A and B, available for building a unit value index (UVI) based on keywords from temporal data acquisition on market state and response variables. FIG. 12 serves as a summary of the embodiments discussed with reference to FIGS. 1-11. At block 1204, temporal data acquisition occurs to acquire and construct a time-series set of data for market state and response variables for each keyword market. At block 1208, the method computes market delta state variables and delta response variables at each state transition (see Table 1).

Depending on the Method (A or B), one of two paths are chosen. Taking the Method A path, at block 1212, the method constructs empirical probability distributions (FIGS. 5-6). At block 1216, the method computes the expected and dispersion values E[ ], D[ ] based on variance or Gini index variant calculations (FIGS. 10-11). At block 1220, response models are built to, at block 1224, retrieve coefficients for the UVI of the keyword market such as those discussed with reference to FIG. 5.

Taking the Method B path, at block 1228, the method computes market dispersions based on market level data such as bid (b)×quality score (QS) per rank, click share by advertisers, or market utilization variants. For instance, at block 1232, the method uses a Gini index with a bid (b) and QS, and at block 1236, the method uses a Gini index with total click share. Various other market state and response data discussed above may also be used to build the Gini index.

Regardless of whether Method A or Method B is employed, at block 1240, the unit value index for a keyword is the output. At block 1244, a total value index (TVI) for the keyword is determined from the aggregation of all searches and clicks in response to the keyword.

Figure 13:
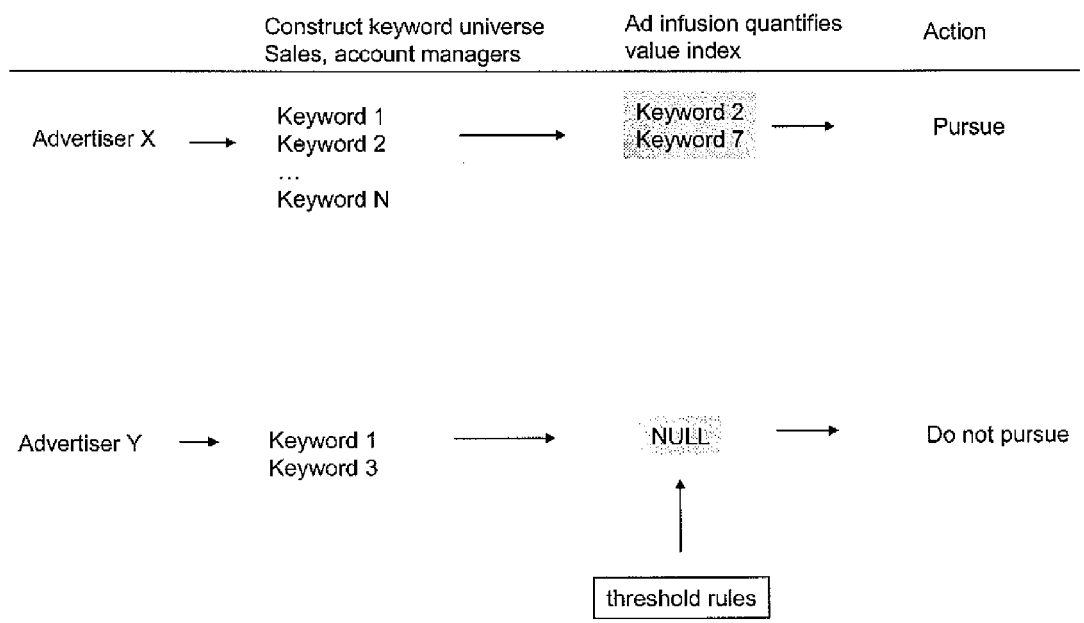
FIG. 13 is a graph chart depicting advertiser-keyword mapping provided for by the system of FIG. 1 and that ultimately results in recommendations whether to pursue an advertiser-keyword combination.

FIG. 13 is a graph chart depicting advertiser-keyword mapping provided for by the system of FIG. 1 and that ultimately results in recommendations whether to pursue an advertiser-keyword combination. More particularly, FIG. 13 illustrates how value index calculation is the building component in models that determines the subset of keywords from the total set of relevant keywords by advertisers. Utilizing total value index by keyword, the system 100 provides for (1) identifying underserved keyword markets and economically ranking them; and (2) computing the value of a given potential advertiser to an OSP to decide whether to make a recommendation to spend sales and marketing acquisition dollars related to advertiser-keyword combinations.

Let KW(Advertiser A)={kw1, kw2, . . . , kwA} represent a set of relevant keywords for a given Advertiser A. Note that "KW" stands for keyword. There are internal/external technologies which can provide this set of keywords for an Advertiser A based on a uniform resource locator (URL), a business category, a set of products, an advertiser, and so on. Generally, cardinality of the keyword set KW(Advertiser A) is huge, which may ignite scalability and operational tracking issues. From an OSP perspective, the desire is to maximize yield while minimally matching the total number of keywords.

Given an advertiser A, utilizing unit value indices, the system 100 can recommend a subset of the set of keywords that best directs OSP economics. This step is called identification of Advertiser A's best portfolio of keywords to OSP economics, and is shown in the first column of the graph of FIG. 13. Let L denote the max number of keywords Advertiser A can efficiently track, also represented in the first column of the graph of FIG. 13. After L is determined, the subset of ads within L is competitively included in the keyword market defined by L as discussed above with reference to FIGS. 1-12. This step is shown in the second column of the graph of FIG. 13. The "threshold rules" referred to FIG. 13 refer to the rules employed to quantify the value index of each advertiser. Ultimately, as shown in the last column of the graph of FIG. 13, an action is recommended with regard to each advertiser and the subset of ads within L.

For each advertiser, the mathematical model may also be solved with a mixed-integer program that can be optimally solved using existing solver technologies (e.g., Excel Solver, ILOG CPLEX, etc.). In mathematical terms, let $y_{i,k}$ be the decision variable if keyword k is assigned to advertiser A. We then solve the following maximization problem:

$$\max_{y_{i,k}} \Sigma V(k) y_{i,k}$$

subject to where $y_{i,k} \in 0,1$ and $k \in \{1,2, \ldots, k(A)\}$. Equation 4

$$\Sigma y_{i,k} \leq L$$

Figure 14:
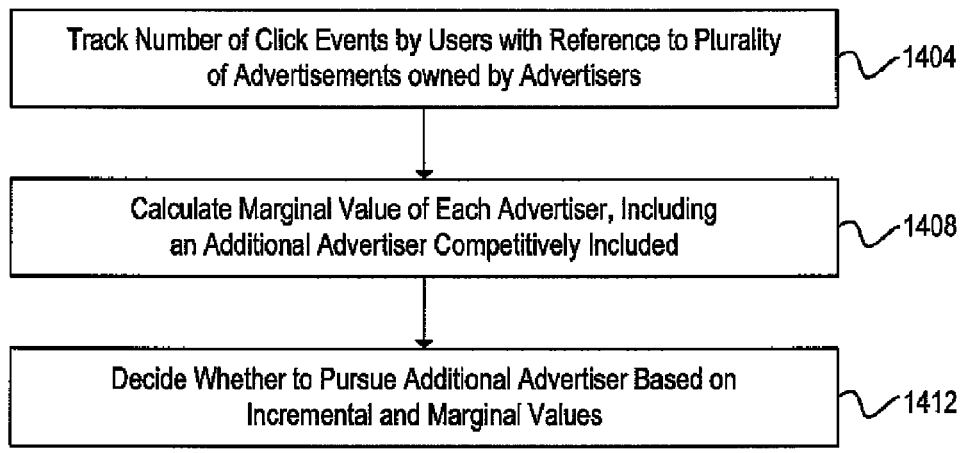
FIG. 14 is a flow chart of a method for valuating an advertiser considered for acquisition.

FIG. 14 is a flow chart of a method for valuating an advertiser considered for acquisition. At block 1404, click-related data generated by online users is captured with reference to a plurality of ads owned by a plurality of advertisers in a keyword market. At block 1408, a marginal value of each of the plurality of advertisers is calculated as a function of a plurality of average market factors, wherein the marginal value of an additional advertiser is also calculated to result in at least an estimate displaced revenue if at least one advertisement of the additional advertiser for at least one keyword were competitively included in the keyword market. At block 1412, whether to pursue the additional advertiser is decided based on the marginal value of the additional advertiser as associated with the at least one keyword.

Figure 15:
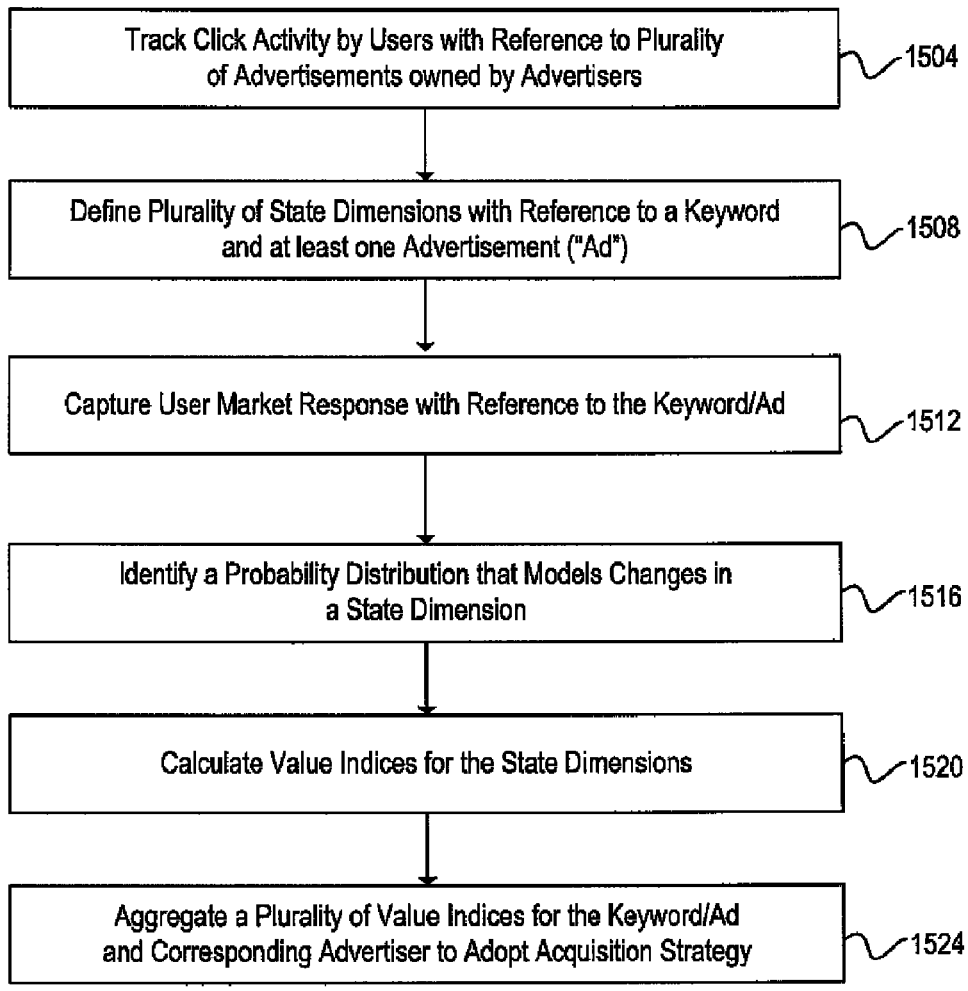
FIG. 15 is a flow chart of a method for developing a keyword value index in ad markets to enable adoption of advertiser acquisition strategies.

FIG. 15 is a flow chart of a method for developing a keyword value index in ad markets to enable adoption of advertiser acquisition strategies. At block 1504, click activity by users is tracked with reference to a plurality of advertisements owned by a plurality of advertisers in a keyword market, wherein the advertisements are displayed to the users through a set of hierarchal search results pages. At block 1508, a plurality of state dimensions are defined with regards to at least one keyword related to at least one advertisement, including at least one of a page display depth, a page quality score, and a page bid. At block 1512, a user response and market state changes to the at least one keyword and corresponding advertisement are captured, including data representative of at least a number of clicks and realized revenue therefrom. At block 1516, based on the defined state dimensions and the user market response, a probability distribution that models changes in at least one state dimension is identified. At block 1520, value indices for the at least one of the page display depth, the page quality score, and the page bid from the probability models are calculated. At block 1524, a plurality of the value indices are aggregated at a level of the at least one keyword for the advertiser that owns the at least one advertisement to adopt an advertiser acquisition strategy.

Figure 16:
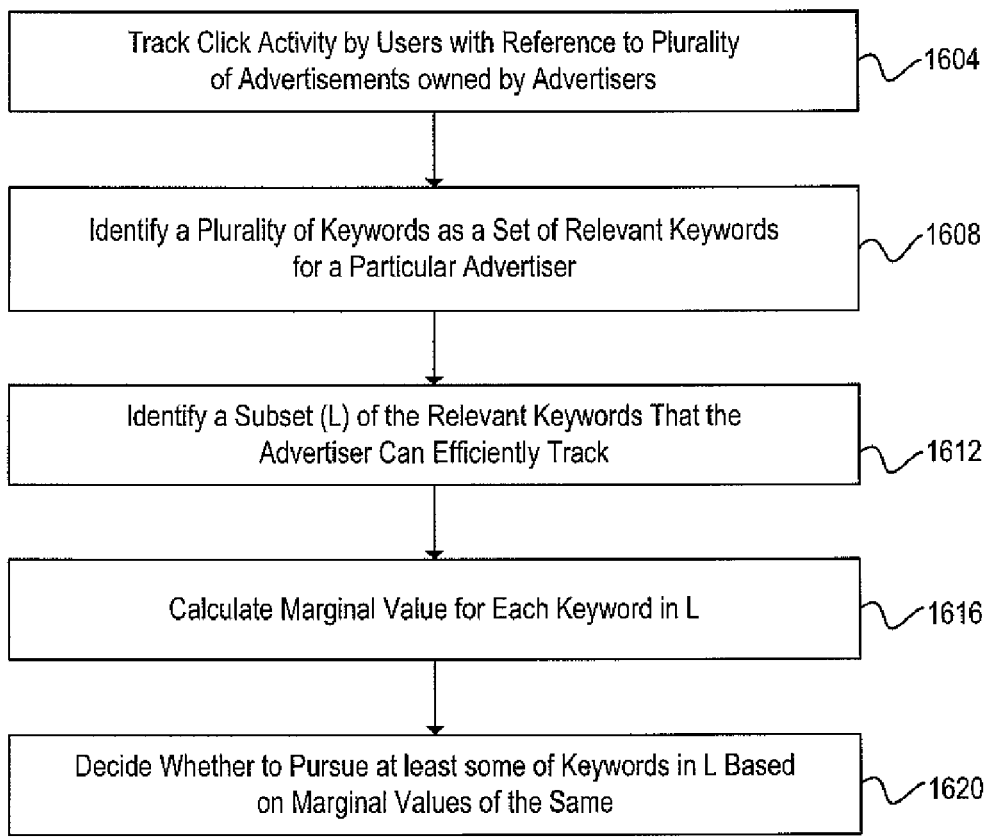
FIG. 16 is a flow chart of a method for valuating an advertiser and associated keywords considered for acquisition.

FIG. 16 is a flow chart of a method for valuating an advertiser and associated keywords considered for acquisition. At block 1604, click activity by users is tracked with reference to a plurality of advertisements owned by a plurality of advertisers in a keyword market. At block 1608, a plurality of keywords are identified as a set of relevant keywords for a particular advertiser of the plurality of advertisers within the keyword market. At block 1612, a subset (L) of the set of relevant keywords is identified as those keywords that the advertiser can efficiently track. At block 1616, a marginal value of each of the keywords within the subset L of keywords for the particular advertiser is calculated, wherein each marginal value is based on at least an estimated displaced revenue if at least one advertisement of the particular advertiser for each keyword were competitively included in the keyword market. At block 1620, whether to pursue at least some of the subset L of keywords of the set of relevant keywords is decided for the particular advertiser in the keyword market based on the marginal values of each respective keyword.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A method for valuating an advertiser considered for acquisition, the method executed by a server having a processor and memory, the method comprising:
    capturing, with the server, click-related data by users with reference to a plurality of advertisements owned by a plurality of advertisers in a keyword market;
    calculating, by a marginal value indicator executed by the processor, a marginal value of each of the plurality of advertisers as a function of a plurality of averaged market factors, wherein the marginal value of an additional advertiser is also calculated to result in at least an estimated displaced revenue when at least one advertisement of the additional advertiser for at least one keyword is competitively included in the keyword market; and
    deciding, by the server, whether to acquire the additional advertiser within the keyword market based on the marginal value of the additional advertiser as associated with the at least one keyword.

2. The method of claim 1, wherein the plurality of averaged market factors comprise averaged values for at least one selected from the group consisting of bid amounts, total advertising spending, an advertiser-specific quality score, a market page quality, a page bid, or a market maximum bid.

3. The method of claim 2, wherein calculating an average marginal value of each of the plurality of advertisers is further a function of at least one selected from the group consisting of a dispersion of quality score, a dispersion of bids, a total number of advertisers, and a user response by the users.

4. The method of claim 1, wherein the marginal value of the additional advertiser depends on at least one selected from the group consisting of a highest bid price attainable from the additional advertiser for the at least one keyword, a quality score dependant on relevancy of the at least one keyword to the at least one advertisement, and a combination thereof.

5. The method of claim 4, further comprising:
letting V(k) denote a marginal unit value for each keyword (k);
letting V(k, ∂b, ∂Q) denote a marginal value of an advertiser where b is an expected bid and Q is an expected quality score of an advertiser; and
calculating V(k), an expected marginal value of the additional advertiser, as determined by ∫∫∫V(k, ∂b, ∂Q)∂b∂Q through integrating over substantially all possible bid and quality values of the additional advertiser.

6. The method of claim 5, further including change in display depth ∂d within the calculation of the expected marginal value of the additional advertiser.

7. The method of claim 5, further comprising:
calculating a total value index of the additional advertiser by multiplying a search frequency, f(k), of the keyword times the expected marginal value V(k) of the additional advertiser.

8. The method of claim 4, further comprising:
calculating the quality score of the additional advertiser as a function of at least one selected from the group consisting of a ranking, a click-through-rate (CRT), and a click yield.

9. A method for developing a keyword value index in advertisement markets to enable adoption of advertiser acquisition strategies, the method executed by a server having a processor and memory, the method comprising:
tracking, with the server, click activity by users with reference to a plurality of advertisements owned by a plurality of advertisers in a keyword market, wherein the advertisements are displayed to the users through a set of hierarchal search results pages;
defining, by the server, a plurality of state dimensions with regards to at least one keyword related to at least one advertisement, including at least one selected from the group consisting of a page display depth, a page quality score, and a page bid;
capturing, with the server, a user response and market state changes to the at least one keyword and corresponding advertisement, including data representative of at least a number of clicks and a realized revenue therefrom;
based on the defined state dimensions and the user response, identifying, by the processor, a probability distribution that models changes in at least one state dimension;
calculating, with a value indices builder executed by the processor, value indices for the at least one selected from the group consisting of the page display depth, the page quality score, and the page bid from the probability models; and
aggregating, by the processor, a plurality of the value indices at a level of the at least one keyword for the advertiser that owns the at least one advertisement to adopt an advertiser acquisition strategy.

10. The method of claim 9, wherein the set of hierarchal search results pages further includes a plurality of display pages, together "results pages."

11. The method of claim 10, wherein identifying probability distribution that models changes in at least one state dimension comprises letting ∂$R_{k,t}$(∂d, ∂PQ, ∂b) and ∂$C_{k,t}$(∂d, ∂PQ, ∂b) comprise, respectively, revenue and click state-response changes between t and t+1 in time, wherein ∂$R_k$ and ∂$C_k$ comprise response probabilities based on market changes, including ∂d (change in page depth), ∂PQ (change in page quality), and ∂b (change in page bid).

12. The method of claim 11, further comprising:
calculating a marginal value of each of the plurality of advertisers as a function of a plurality of averaged market factors, wherein the marginal value of an additional advertiser is also calculated to result at least an estimated displaced revenue if at least one advertisement of the additional advertiser for at least one keyword were competitively included in the keyword market;
wherein the marginal value of the additional advertiser depends on at least one selected from the group consisting of a highest bid price attainable from the additional advertiser for the at least one keyword, a page quality score dependant on relevancy of the at least one keyword to the at least one advertisement, and a combination thereof.

13. The method of claim 12, wherein the plurality of averaged market factors comprise averaged values for at least one selected from the group consisting of bid amounts, total advertising spending, an advertiser-specific quality score, a market page quality, a page bid, and a market maximum bid.

14. The method of claim 12, further comprising:
letting V(k) denote a marginal unit value for each keyword (k);
letting V(k, ∂d, ∂PQ, ∂b) denote a marginal value of an advertiser where d is an expected display depth, PQ is an expected page quality score, and b is an expected page bid; and
calculating V(k), an expected marginal value of the additional advertiser, as determined by ∫∫∫V(k, ∂d, ∂PQ, ∂d)∂d∂PQ∂b through integrating over substantially all possible bid amounts and page quality values of the additional advertiser.

15. The method of claim 14, further comprising:
determining a total expected marginal value by multiplying an expected frequency of searches for the keyword, f(k), by the marginal value of the additional advertiser V(k).

16. The method of claim 11, wherein calculating the value indices comprises taking a mean of a revenue state-response change (∂$R_k$) given by E[∂$R_k$] and a dispersion of a revenue state-response change (∂$R_k$) given by D[∂$R_k$], and calculating f(E[∂$R_k$], D[∂$R_k$]), a function of the mean and dispersion revenue state-response changes.

17. The method of claim 16, further comprising:
detecting a change in the user response; and
updating the expected page bid, the expected page quality score, and the dispersion in response to the detected change.

18. The method of claim 16, wherein the dispersion D[∂$R_k$] is estimated with at least one selected from the group consisting of a GINI index and another variance.

19. The method of claim 9, wherein aggregating the plurality of the value indices is performed on at least a subset of all the keywords owned by the advertiser.

20. A method for valuating an advertiser and associated keywords considered for acquisition, the method executed by a server having a processor and memory, the method comprising:
tracking, with the server, click activity by users with reference to a plurality of advertisements owned by a plurality of advertisers in a keyword market;
identifying, by the server, a plurality of keywords as a set of relevant keywords for a particular advertiser of the plurality of advertisers within the keyword market;

identifying, by the processor, a subset (L) of the set of relevant keywords as those keywords that the advertiser can efficiently track;

calculating, by a marginal value indicator executed by the processor, a marginal value of each of the keywords within the subset L of keywords for the particular advertiser, wherein each marginal value is based on at least an estimated displaced revenue when at least one advertisement of the particular advertiser for each keyword is competitively included in the keyword market; and deciding, by the server, whether to acquire at least some of the subset L of keywords of the set of relevant keywords for the particular advertiser in the keyword market based on the marginal values of each respective keyword.

21. The method of claim 20, wherein each incremental marginal value depends on at least one selected from the group consisting of a highest bid price attainable from the particular advertiser for each respective keyword within the subset L of keywords, a quality score of the particular advertiser dependant on relevancy of each respective keyword to the at least one advertisement, and a combination thereof.

22. The method of claim 21, further comprising:

letting V(k) denote a marginal unit value for each keyword (k);

letting V(k, ∂b, ∂Q) denote a marginal value of an advertiser where b is an expected bid and Q is an expected quality score of an advertiser in relation to each keyword (k); and calculating V(k), an expected marginal value of each keyword, as determined by ∫∫∫V(k, ∂b, ∂Q)∂b∂Q through integrating over substantially all possible bid and quality values of the additional advertiser.

23. The method of claim 22, further including change in display depth ∂d within the calculation of the expected marginal value of each keyword.

24. The method of claim 22, further comprising:

letting $y_{i,k}$ comprise a decision variable for whether each keyword (k) of the subset L of the relevant keywords is to be pursued for inclusion in the keyword market; and executing the decision step of whether to pursue at least some of the subset L of the keywords by solving:

$$\max_{y_{i,k}} \Sigma V(k) y_{i,k}$$
$$\text{subject to} \quad \Sigma y_{i,k} \leq L.$$
where $y_{i,k} \in {0, 1}$ and $k \in \{1, 2, \ldots, k(A)\}$ 25. The method of claim 22, further comprising: calculating the quality score as a function of at least one selected from the group consisting of a ranking, a click-through-rate (CRT), and a click yield.

* * * * *